United States Patent [19]

Herrington

[11] 4,421,465

[45] Dec. 20, 1983

[54] APPARATUS PROVIDING UNIFORM RESIN DISTRIBUTION IN A COEXTRUDED PRODUCT

[75] Inventor: Fox J. Herrington, Holcomb, N.Y.

[73] Assignee: Mobil Oil Corporation, New York, N.Y.

[21] Appl. No.: 359,554

[22] Filed: Mar. 18, 1982

Related U.S. Application Data

[62] Division of Ser. No. 201,688, Oct. 30, 1980, Pat. No. 4,344,907.

[51] Int. Cl.$^3$ ............................................... B29F 3/06
[52] U.S. Cl. ................................. 425/133.1; 264/173; 425/462
[58] Field of Search ................................ 425/133.1, 462; 264/173

[56] References Cited

U.S. PATENT DOCUMENTS

| | | | |
|---|---|---|---|
| 2,141,776 | 12/1938 | Vautier et al. | 264/173 |
| 2,859,476 | 11/1958 | Lainson | 425/466 |
| 2,978,748 | 4/1961 | McCauley et al. | 425/467 |
| 3,308,508 | 3/1967 | Schrenk | 425/462 |
| 3,365,750 | 1/1968 | Donald | 425/133.1 |
| 3,611,492 | 10/1971 | Scheibling | 425/462 |
| 3,669,591 | 6/1972 | Fermi et al. | 425/131.5 |
| 4,061,461 | 12/1977 | Hessenthaler | 425/462 |
| 4,091,064 | 5/1978 | Kakinuma et al. | 425/113 |
| 4,125,585 | 11/1978 | Rosenbaum | 425/133.1 |
| 4,208,175 | 6/1980 | Rosenbaum | 425/462 |
| 4,249,875 | 2/1981 | Hart et al. | 425/133.1 |

FOREIGN PATENT DOCUMENTS 1966876  3/1975  Fed. Rep. of Germany ... 425/133.1

Primary Examiner—Jeffery R. Thurlow
Attorney, Agent, or Firm—Alexander J. McKillop; Michael G. Gilman; James P. O'Sullivan, Sr.

[57] ABSTRACT

Disclosed is a method and apparatus for ensuring uniform distribution of higher and lower viscosity or flow rate resins in a product produced by a coextrusion process. A flow restriction is provided in the flow path of the lower viscosity or flow rate resin to increase the pressure drop of this resin as it passes through a coextrusion die. The increased pressure drop introduced by the flow restriction causes the lower viscosity or flow rate resin to be more uniformly distributed in the extruded product. A specific die construction providing a uniform resin flow channel within the die is also described.

1 Claim, 7 Drawing Figures

APPARATUS PROVIDING UNIFORM RESIN DISTRIBUTION IN A COEXTRUDED PRODUCT

This is a division of application Ser. No. 201,688 filed Oct. 30, 1980, now Pat. No. 4,344,907 issued Aug. 17, 1982.

BACKGROUND OF THE INVENTION

The present invention is directed to a method and apparatus for coextruding two resins having widely varying flow rates or viscosities. In a coextrusion die where two or more resins to be joined have very different flow rates or viscosities, it is difficult to obtain a uniform distribution of both in the extruded product. In particular, it has been found that the lower viscosity or flow rate resin tends to flow laterally to one side of the extrusion die producing a non-uniform flow through an extrusion orifice and a non-uniform distribution of this resin in the extruded product. This phenomenon has been observed even with precisely machined and adjusted dies. The errors are believed due to lateral pressure differentials established within the die which cause migration of the lower viscosity or flow rate resin from one side of the die to the other. These pressure differentials are in turn believed to be caused by small gap errors in the flow channels of the resins as well as in the final die orifice. These errors are difficult to remove and in large measure are due to the limits of machining tolerances of the various die parts and to the number of parts and mating surfaces in the die.

SUMMARY OF THE INVENTION

One object of the present invention is to provide a method and apparatus which ensures uniform distribution of high and low viscosity or flow rate resins, particularly the lower viscosity or flow rate resin, in a coextruded product. To this end, the invention provides a method and apparatus in which a flow restriction is placed within the flow channel of the lower viscosity or flow rate resin in a coextrusion die. The flow restriction creates a large pressure drop in the lower viscosity or flow rate resin which is considerably larger in magnitude than any lateral pressure differentials which might exist in a die due to machining or adjustment errors. Because of this larger pressure differential in the direction of extrusion, the lower viscosity or flow rate material does not migrate laterally across the die to any appreciable extent.

An additional object of the invention is the provision of a die construction in which the flow channels for the resins can more easily be maintained with a uniform precise gap. This is accomplished by arranging opposing planar surfaces defining a flow gap on opposing die pieces which pieces are engaged at respective planar surfaces which are in turn in parallel with the opposing die surfaces defining the gap. Since it is much easier to machine and fit together planar surfaces, the interconnection of the two die pieces establishes and maintains a uniform flow channel gap thereby minimizing pressure differentials laterally of the die.

These and other objects and advantages of the invention will be more readily seen from the following description which is provided in conjunction with the accompanying drawings.

DETAILED DESCRIPTION OF THE INVENTION

Figure 1:
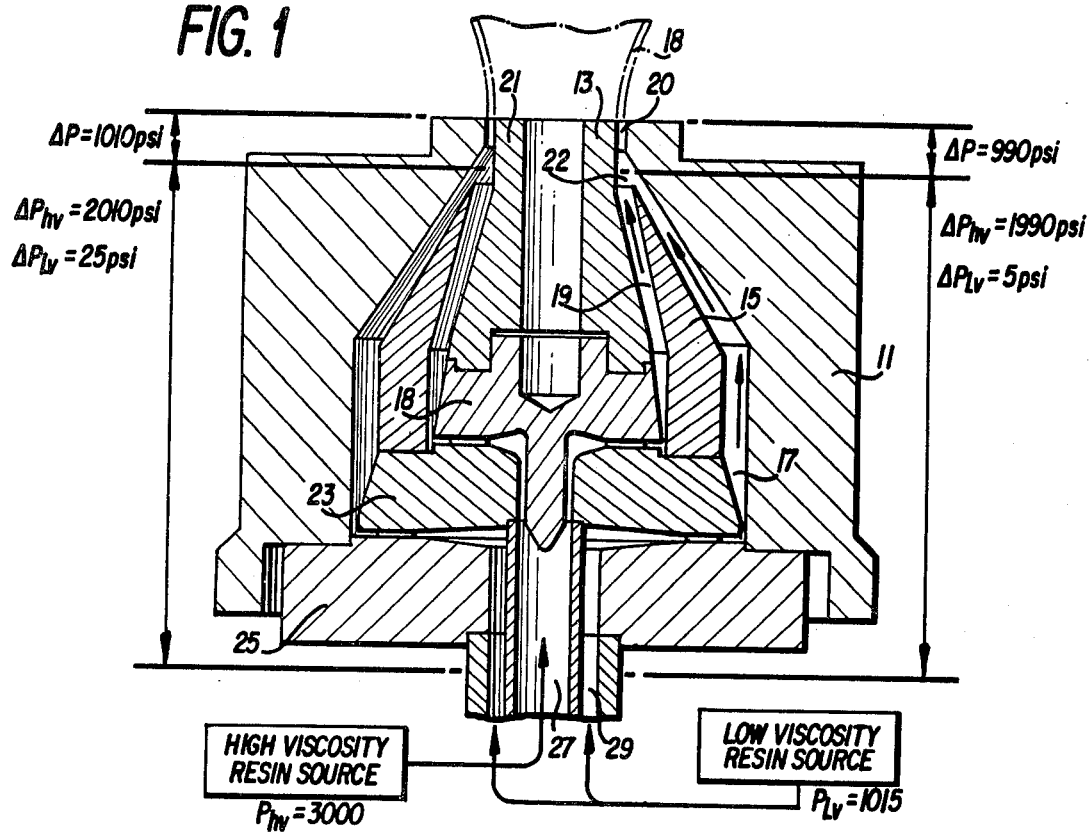
FIG. 1 illustrates the cross section of a coaxial coextrusion die to which the flow restriction of the invention can be applied.
Figure 2:
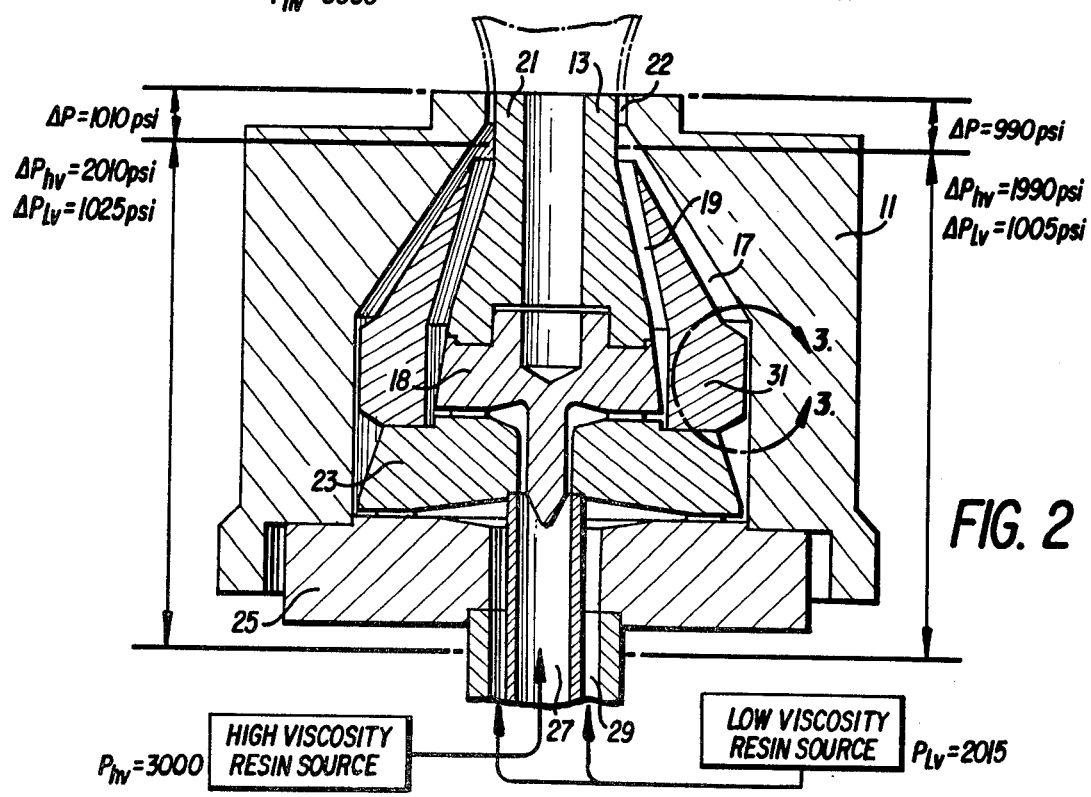
FIG. 2 illustrates the coextrusion die of FIG. 1, but modified to include the flow restriction of the invention.

The present invention will first be described with respect to FIGS. 1 and 2, FIG. 1 showing a co-axial tubular coextrusion die without a flow restriction, and FIG. 2 showing the same die with the flow restriction of the invention. As shown in FIG. 1, the die comprises an outer body 11 and an inner mandrel 13 which together define an exit orifice 20 for the die. The mandrel 13 has an upper mandrel portion 21 and a lower mandrel portion 18. Separating the outer body 11 and inner mandrel 13 is a divider 15 which extends to a flow junction region 22 and which is supported to an inner body member 23. The inner body member 23 in turn is supported to a base 25 of the die. The divider 15 and inner body member 23 separate the outer body 11 and base 25 from the mandrel 13 and define a lower viscosity or flow rate resin flow path 17 between divider 15 and outer body 11 and a higher viscosity or flow rate resin flow path 19 between divider 15 and mandrel 13. These flow paths are respectively coupled to resin inlet 29 and resin inlet 27 which in turn can be coupled to respective resin sources.

When the die illustrated in FIG. 1 was first constructed, it was used to extrude a high density polyethylene on the inner flow path 19 at about 80 pounds per hour and a polypropylene on the outer flow path 17 at about 9 pounds per hour. The polyproplylene was considerably lower in viscosity than the polyethylene and was also flowing at a lower rate. The coextruded tubular product 18 had all of the polyproplyene distributed within about half its periphery. This problem occurred despite precise machining and adjustment of the die parts.

The reason for the non-uniform distribution was found to be the relatively low pressure drop of the lower viscosity or flow rate resin from the inlet to the junction region 22 of the die vis á vis the magnitude of pressure differentials created laterally of the die. For purposes of explaining this phenomenona, several hypothetical pressure figures have been added to FIG. 1 for illustration. The pressure drop $\Delta P$ through the die lips, that is from junction region 22 to the end of orifice 20, is approximately 1000 psi. However, because of minor die errors, there is a slight difference in this pressure drop from one side of the die to the other. As illustrated, it is 990 psi on the right and 1010 psi on the left. The higher viscosity or flow rate resin is flowing at such a high rate that its pressure drop $\Delta P_{hv}$ between the inlet and junction region 22 is approximately 2000 psi. In actuality, this pressure drop is 2010 psi on the left of the die and 1990 psi on the right, a small difference. By contrast, the lower viscosity or flow rate resin is flowing at a much lower rate such that its average pressure drop $\Delta P_l$ v from the inlet to the junction region 22 is only 15 psi, which is small compared with the 20 psi error from one side of the die to the other at junction region 22. As a result, the actual pressure drop of the lower viscosity or flow rate resin in the direction of extrusion is significantly different between the left and right sides of the die (25 psi on the left and 5 psi on the right) and a significant error in flow rate of the lower viscosity or flow rate resin is established creating a non-uniform distribution of this resin in the extruded product.

If a restriction is added in the path of the lower viscosity or flow rate resin to increase the average 15 psi pressure drop by approximately 1000 psi, the pressure error from one side of the die to the other at the junction region 22 is relatively small in comparison with the average 1051 psi drop from inlet to the junction region. That is, the actual pressure drop becomes 1025 psi on the left side of the die and 1005 on the right. This is a considerably smaller pressure differential relative to the total pressure drop in the extrusion direction than existed without the flow restriction and results in a uniform distribution of the lower viscosity or flow rate resin in the extruded product.

FIG. 2 illustrates the flow restriction 31 in the lower viscosity or flow rate flow path 17. The relative pressure differentials as described above are also illustrated in this figure. The flow restriction provides a considerable pressure drop in the path of the lower viscosity or flow rate resin in comparison with the lateral pressure differential existing therein at junction region 22.

The precise amount of pressure drop which is required to obtain a uniform distribution of lower viscosity or flow rate resin in the final product will, of course, depend on the construction of the extrusion die, and the errors in machining and adjustment associated therewith.

Two areas have been isolated as being largely responsible for creation of lateral pressure differentials within the die and thus the non-uniform lower viscosity or flow rate resin distribution in the extruded product. The first is gap error in the flow path of the higher viscosity or flow rate resin, which produces non-uniform pressure drops of this resin at junction region 22. Pressure drop differences in the high viscosity or flow rate resin at the point of junction region 22 naturally affect the flow of the lower viscosity or flow rate resin at junction region 22. The second is gap error of the die orifice 20. Irregularities therein also cause pressure drop differences for the total resin flow which affect the flow of the lower viscosity or flow rate resin. Even very minor misadjustments in the orifice 20 have been found experimentally to result in all of the lower viscosity or flow rate resin flowing laterally to one side of the die.

In studying the problem of incorrect gap adjustment of the orifice 20, it has been discovered that as a restriction provided in the lower viscosity or flow rate resin flow path 17 varies from an infinite amount to some lower value, errors in the gap of orifice 20 have an increasing effect on the uniformity of distribution of the lower viscosity or flow rate resin in the extruded product. When the amount of restriction (and correspondingly the amount of introduced pressure drop) becomes very small, then even very small errors in the adjustment of the orifice 20 gap will cause a major redistribution of the lower viscosity or flow rate resin, with only a very small effect on the higher viscosity or flow rate resin.

The amount of restriction needed in the lower viscosity or flow rate resin flow path to ensure distribution uniformity is that which causes the lower viscosity or flow rate resin to stay in the same relationship with the higher viscosity or flow rate resin as the gap of orifice 20 is varied. In other words, when a 10% change in distribution occurs in the higher viscosity or flow rate resin, then no more than a 10% change in flow distribution in the lower viscosity or flow rate resin should result. By making the flow changes in the lower viscosity or flow rate resin track with those of the higher viscosity or flow rate resin (which changes relatively insignificantly with errors in orifice gap dimensions) a very uniform distribution of the lower viscosity or flow rate resin is achieved in the extruded product.

After some investigation, it has been discovered that to achieve this objective the minimum pressure drop ($\Delta P_{min}$) in the lower viscosity or flow rate flow path should satisfy the following relationship:

$$\Delta P_{min} = \Delta P_1 \left( \sqrt{1+e} - 1 \right)^{(n_2-n_1)} \quad (1)$$

where $\Delta P_1$ is the pressure drop through the higher viscosity or flow rate flow channel, e is the error in total flow through the orifice 20 (the maximum flow through the orifice $=(1+e)\times$ the minimum flow), and $n_1$ and $n_2$ are flow exponents of the resins respectively in the lower and higher viscosity or flow rate flow paths each of which is defined by the equation $\tau = K\delta^n$ where $\tau$ equals the shear stress of a resin in its associated flow channel, K equals the viscosity of the resin at a shear rate equal to 1, $\delta$ equals the shear rate of the resin, and n equals the flow exponent.

Equation (1) sets the minimum pressure drop through the low viscosity or flow rate flow channel 17 which is required to satisfactorily overcome gap errors in orifice 20. The maximum pressure is limited only by the mechanical constraints of the rest of the process i.e. maximum tolerable pressures, etc. and manufacturing problems inherent in making the die.

If the higher viscosity and lower viscosity or flow rate resins have the same flow exponent, i.e. $n_1 = n_2$, which might occur with a low density and high density polyethylene, then the minimum pressure drop through the lower viscosity or flow rate flow path 17 will be equal to the pressure drop of the high viscosity of flow rate resin as it passes through flow path 19.

Most of the resins handled by a coextrusion die will have flow exponents in the range of 0.3 to 0.7 making it conceivable that a difference in flow exponents ($n_1 - n_2$) would range from $-0.4$ to $+0.4$. The table below illustrates the ratio of the minimum pressure drop ($\Delta P_{min}$) through the lower viscosity or flow rate flow path 17 to the pressure $\Delta P_1$ drop through the higher viscosity or flow rate flow path 19 required for various combinations of orifice gap errors (flow errors e) and flow exponent difference values.

TABLE

| $n_1 - n_2$ | $\dfrac{P_{min}}{\Delta P_1}$ | | | | |
|---|---|---|---|---|---|
| | e = .001 | e = .01 | e = .1 | e = .5 | e = 1.0 |
| .4 | .05 | .12 | .30 | .55 | .70 |
| .2 | .22 | .35 | .55 | .74 | .84 |
| 0 | 1.00 | 1.00 | 1.00 | 1.00 | 1.00 |
| −.2 | 4.57 | 2.89 | 1.83 | 1.35 | 1.19 |
| −.4 | 20.91 | 8.33 | 3.35 | 1.82 | 1.42 |

The most meaningful columns are e=0.01 and e=0.1 which respectively represent typical orifice 20 flow errors of 1% and 10%.

Errors in the gap of the high viscosity or flow rate flow path 19 which also affect uniform flow of material through the lower viscosity or flow rate flow path 17 can also be compensated for by flow restriction 31. For these errors, it has been found that the minimum pressure drop ($\Delta P_{min}$) which must exist in the low viscosity or flow rate resin flow path 17 is defined by the following equation:

$$\Delta P_{min} = \frac{4h}{e_1} \Delta P_1 \qquad (2)$$

where $\Delta P_1$ equals the pressure drop through the high viscosity or flow rate flow path 19, h represents the error in the effective gap of flow path 19 and $e_1$ represents the error in resin flow through the low viscosity or flow rate flow path 17. The effective gap is essentially a composite of the changing gap dimensions which occur in the flow direction of flow path 19. The error in total flow $e_1$ for the low viscosity flow rate resin is defined as (the maximum resin flow through the flow channel 17)=$(1+e_1)\times$(the minimum resin flow through channel 17). The error h in effective gap for the high viscosity or flow rate channel is defined as (the maximum effective gap of the high viscosity or flow rate channel)=$(1+h)\times$(the minimum effective gap of the high viscosity or flow rate channel).

As illustrated in equation 2, the minimum pressure drop needed to compensate for gap errors in the high viscosity or flow rate flow path is related to the amount of gap error h and flow error $e_1$ respectively created by the gaps of the high viscosity or flow rate and low viscosity or flow rate flow paths. A reasonable accuracy is for a 10% error in effective gap of the high viscosity or flow rate resin in flow path 19 to cause a like 10% error in flow of the low viscosity or flow rate resin through flow path 17 i.e. $h=e_1$. To attain this, the minimum pressure drop $\Delta P_{min}$ through the lower viscosity or flow rate flow path 17 must be four times the pressure drop through the higher viscosity or flow rate flow path 19.

Since the amount of tolerated flow error is largely judgmental and design dependent, a practical range from the ratio ($e_1/h$) is $0<(e_1/h)\leq 10$. In other words, a 1% error (h) in the gap of the high viscosity or flow rate flow path 19 produces at most a corresponding 10% ($e_1$) error in flow through the lower viscosity or flow rate path 17. Restraining this ratio between the values of 0 and 10 provides a reasonable accuracy for the die and uniform flow distribution of the lower viscosity or flow rate resin.

In order to compensate for errors in the adjustment of the orifice 20 as well as errors in the gap of the high viscosity or flow rate flow path 19, the larger of the $\Delta P_{min}$ values from equations 1 and 2 should be used.

Figure 6:
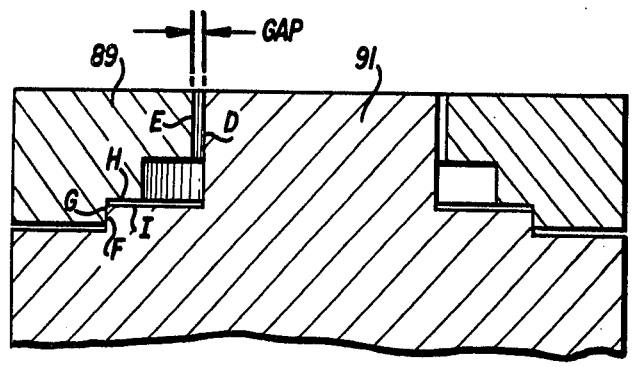
FIG. 6 is a schematic cross sectional represention of a prior art technique for providing a flow channel in a die.

While the flow restriction of the invention can compensate for errors in the orifice gap 20 and high viscosity or flow rate resin flow path 19, the coextrusion die can also be designed in a manner which minimizes flow path gap errors. One source of gap errors in a conventional die is illustrated in the representative diagram of FIG. 6. FIG. 6 shows a conventional extrusion die construction for forming a flow path gap. The gap is established by properly machined and positioned cylinders 89 and 91 which fit together at surfaces G and F. In order to maintain the gap perfectly uniform, it is necessary that cylinders 89 and 91 be perfectly round and concentric. While perfect roundness is easy to obtain with conventional precision machining techniques, it is most difficult to obtain proper concentricity of cylinders 89 and 91 since both not only must be made perfect, they must also fit together perfectly. This is in practice very difficult to obtain and can produce gap errors in the following areas:

(a) The concentricity of surface E to surface G;
(b) the perpendicularity of surface H to surfaces E and G;
(c) the concentricity of surface D to surface F;
(d) the perpendicularity of surface J to surfaces D and F; and
(e) the concentric fit of surface G to surface F which is limited by the diametric clearance necessary to fit the two die parts 89 and 91 together.

Figure 7:
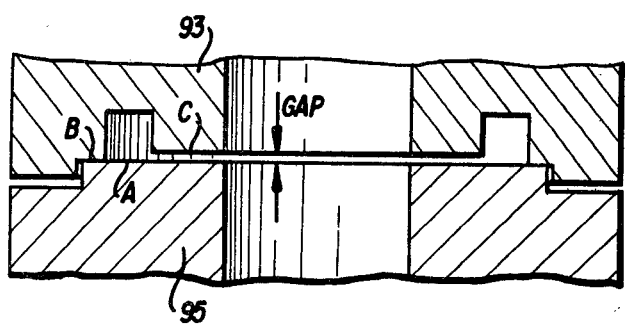
FIG. 7 is a schematic cross section representation of a manner of providing a flow channel in a die in accordance with the invention.

The concentricity problem can be eliminated with the die construction schematically illustrated in FIG. 7. A planar surface A is provided on a lower die portion which can easily be turned on a lathe in a conventional manner with a high degree of precision. A portion of planar surface A defines one wall of the gap. A like planar surface B is provided on an upper die portion. Both surfaces A and B can be turned on a lathe in the same setup producing no significant error between them. Surface B is offset from and in parallel with a planar surface C which defines another wall of the gap by an amount corresponding to the desired gap. If there is any error in the magnitude of the offset between surfaces B and C due to the limits of manufacturing tolerance, it is exactly the same at all points about the die. Since the die gap is defined by the engagement of flat surfaces B and A no clearances are needed to fit the two die pieces together. Thus, the surfaces A and B can easily be drawn together tightly by bolts to hold the die together and precisely define the gap.

Figure 4:
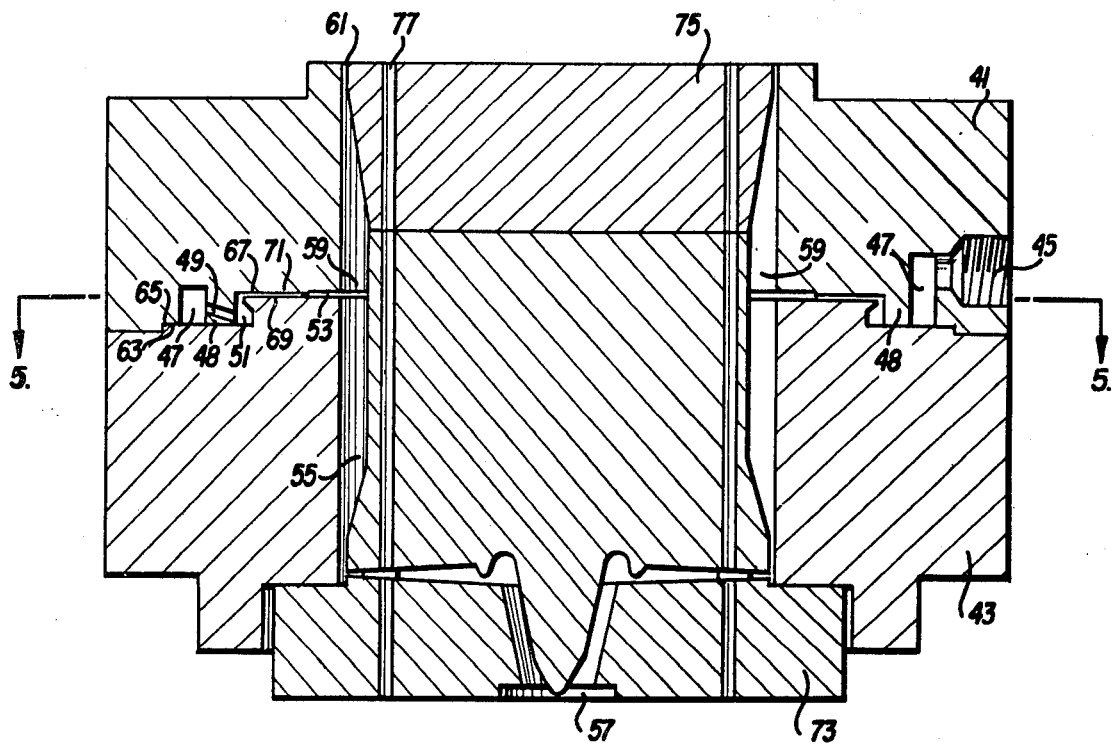
FIG. 4 illustrates another coextrusion die having a flow restriction in accordance with the invention.
Figure 3:
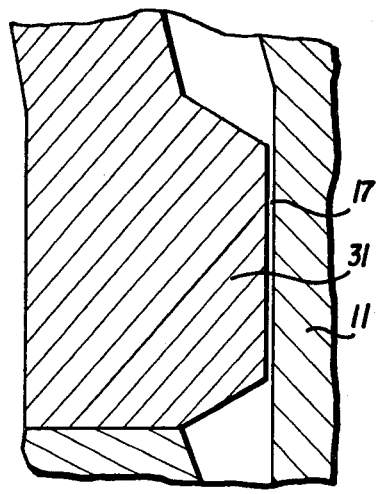
FIG. 3 illustrates an enlargement of the encircled portion of FIG. 2.
Figure 5:
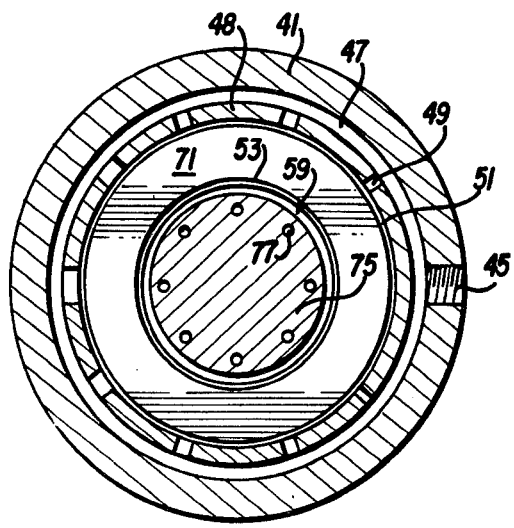
FIG. 5 is a sectional view along the lines 5—5 of FIG. 4.

A specific side fed and axially fed tubular coextrusion die embodying the concept illustrated in FIG. 7 is shown in more detail in FIGS. 4 and 5. The side fed portion of the FIGS. 4 and 5 die has the same construction as in the die described in U.S. Pat. No. 4,285,656, incorporated herein by reference.

The FIG. 4 die includes an upper outer body 41, a lower outer body 43 and an interior mandrel 75, the mandrel 75 and outer body 41 defining between them an extrusion orifice 61. Mandrel 75 is supported to a base 73 which also supports the lower outer body 43. An axial resin inlet 57 is provided for a main flow channel 55 defined between the mandrel 75 and lower outer body 43. A second side feed resin flow channel 53 is defined between the upper and lower outer bodies 41 and 43. The gap of the resin flow channel 53 is created by first and second opposing planar surfaces 67 and 69 respectively provided on the upper and lower outer bodies 41 and 43. Planar surface 67 of the upper outer body 41 is in parallel with a first planar engagement face 65 of the upper outer body 41 which mates with a corresponding second planar engagement face 63 provided on the lower outer body 43. The opposing planar surface 69 on the lower outer body is in parallel with the second planar engagement force 63. As a result, when the upper and lower outer bodies 41 and 43 are engaged at the first and second planar engagement faces 63 and 65 a precise and uniform gap for the second resin supply channel 53 is established. Any error in offset between the planar surfaces 63 and 65 and their associated gap defining surfaces 67 and 69 will be uniform throughout the die and will not establish irregularities along the feed channel 53.

The die of FIG. 4 is shown with planar surface 67 being stepped and having a portion extending toward lower outer body 43 to form a flow restriction 71 for raising the pressure drop of a lower viscosity resin passing through the flow channel 53. It should be understood that FIG. 4 die design need not include a flow restriction 71 and, correspondingly, planar surface 67 need not be stepped.

Completing description of the FIG. 4 die, feed channel 53 and 55 both feed into a junction region 59 established between the upper outer body 41 and inner mandrel 75 which in turn is coupled to the extrusion orifice 61. Air holes 77 are optionally provided through the mandrel 75 and base 73 to allow injection of air or other gas into an extruded resin product, if desired. The feeding of resin to the second feed channel 53 is described in greater detail in the above-referred to application. Briefly, a side inlet 45 feeds resin to an annular flow chamber 47 which surrounds the die and from there the resin flows through ports 49 of increasing diameter spaced along stepped area 48 of the upper outer body 41 into an annular supply channel 51 which feeds the flow channel 53.

While various embodiments of the method and apparatus of the invention have been described above, it should be apparent that many modifications can be made without departing from the spirit or scope of the invention. For example, although tubular extrusion dies have been illustrated, the principles of the invention are also applicable to other types of non-tubular extrusion dies. Accordingly, the invention is not to be limited by the foregoing description, but only by the appended claims.

What is claimed is:

1. A die for coextruding first and second molten streams of resin comprising:
a first flow channel for one of said resin streams, a second flow channel for the other of said resin streams, said first and second channels terminating in a molten resin junction region, and a flow channel coupling said junction region to an extrusion orifice, at least one of said first and second flow channels being defined by first and second opposing die surfaces, each respectively provided on first and second die members, said first and second die members engaging with one another at respective planar engaging faces, the planar engaging face of said first die member being offset from and in parallel with at least a portion of the opposing die surface of said first die member and the planar engaging face of second die member being in parallel with at least a portion of the opposing die surface of said second die member said offset defining the gap size of said at least one flow channel and said parallel arrangement insuring no significant gap error in said channel.

* * * * *